United States Patent [19]
Akuzawa et al.

[11] Patent Number: 5,275,087
[45] Date of Patent: Jan. 4, 1994

[54] WOBBLE PLATE TYPE REFRIGERANT COMPRESSOR

[75] Inventors: Hitoshi Akuzawa, Gunma; Yoshiyuki Saito, Honjo; Norio Kitajima, Isesaki; Takashi Nogi, Honjo, all of Japan

[73] Assignee: Sanden Corporation, Gunma, Japan

[21] Appl. No.: 938,608

[22] Filed: Sep. 1, 1992

[30] Foreign Application Priority Data

Sep. 2, 1991 [JP] Japan .................. 3-77511[U]

[51] Int. Cl.$^5$ .................................. F01B 3/00
[52] U.S. Cl. ............................ 92/71; 417/269; 74/60; 74/357; 464/87
[58] Field of Search ............ 92/12.2, 71; 417/269; 74/60, 357, 356, 355; 464/83, 87, 89, 180

[56] References Cited

U.S. PATENT DOCUMENTS

| | | |
|---|---|---|
| 1,965,407 | 8/1931 | Doughty. |
| 2,446,942 | 8/1948 | McFarland .................. 464/83 |
| 2,973,214 | 2/1961 | Bates et al. ................ 464/87 |
| 3,540,233 | 11/1970 | Pearson .................... 464/83 |
| 4,168,869 | 9/1979 | Stephan. |
| 4,221,545 | 9/1980 | Terauchi ................... 417/269 |
| 4,283,997 | 8/1981 | Takahashi et al. .......... 417/269 |
| 4,683,765 | 8/1987 | Miller. |
| 4,699,530 | 10/1987 | Satoh et al.. |

FOREIGN PATENT DOCUMENTS

| | | |
|---|---|---|
| 0524676 | 3/1956 | Belgium .................. 464/83 |
| 0078984 | 3/1955 | Denmark .................. 464/83 |
| 0799821 | 8/1958 | United Kingdom ........... 464/83 |

Primary Examiner—Thomas E. Denion
Attorney, Agent, or Firm—Baker & Botts

[57] ABSTRACT

A wobble plate type refrigerant compressor is disclosed which includes a compressor housing having a crank chamber and a cylinder block which is provided with an axial central bore and a plurality of cylinders. A plurality of pistons are slidably fitted within each of the cylinders. A wedge-shaped cam rotor is disposed within the crank chamber to rotate together with a drive shaft. A wobble plate is coupled to the pistons through each corresponding connecting rod. The wobble plate is disposed on the inclined surface of the cam rotor to convert rotating motion of the cam rotor into reciprocating motion to be imparted to the pistons while preventing the rotating motion of the wobble plate. A first bevel gear is fixed on the wobble plate and a second bevel gear connected thereto is supported by the cylinder block. The second bevel gear includes a shank portion which is non-rotatably disposed within the central bore of the cylinder block by means of at least one engaging mechanism, such as a key/groove mechanism, provided between the second bevel gear and the cylinder block. The first and second bevel gears intermesh through spherical member to prevent rotation of the wobble plate. The engaging mechanism includes an axial hollow space or groove formed between the shank portion of the second bevel gear and the cylinder block, and a rod member or key fittingly disposed within the axial hollow space. The engaging mechanism further includes a dampening member or vibroisolating member for dampening torque which acts on the shank portion of the second bevel gear to thereby reduce vibration and noise.

9 Claims, 3 Drawing Sheets

WOBBLE PLATE TYPE REFRIGERANT COMPRESSOR

BACKGROUND OF THE INVENTION

1. Field Of The Invention

The present invention generally relates to a refrigerant compressor, and more particularly, to a wobble plate type refrigerant compressor used in an automotive air conditioning system.

2. Description Of The Prior Art

A wobble plate type compressor suitable for use as in an automobile cooling system is described in U.S. Pat. No. 4,444,549 to Takahashi. In such a compressor, rotation of the drive shaft is converted into reciprocating motion of a plurality of pistons through a cam rotor having a sloping end surface fixedly mounted on an inner end of the drive shaft and a wobble plate disposed on the sloping end surface through a needle bearing. The wobble plate is supported on a fixed member such as a cylinder block so that the wobble plate is prevented from rotating but is nutatable or able to wobble. Thus, the wobble plate wobbles by rotation of the cam rotor, and the plurality of piston rods connected to the wobble plate are reciprocated to compress fluid within a like plurality of cylinders.

In a known supporting mechanism for the wobble plate of the above described compressor, a first bevel gear is fixed to the wobble plate at the central portion thereof. A second bevel gear, which engages the first bevel gear, is supported on the cylinder block in such a manner that the rotation of the second bevel gear is prevented. The second bevel gear is formed on the end of a cylindrical rod, which supports the wobble plate and enables it to nutate. The cylindrical rod is supported in the center bore formed in the cylinder block. Both bevel gears are provided with ball seats. Thus, the wobble plate is prevented from rotating by the engagement between both bevel gears, and is able to nutate along the ball surface.

A supporting mechanism for a wobble plate in a wobble plate compressor is described in U.S. Pat. No. 4,221,545 to Terauchi. This supporting mechanism includes a cylindrical support portion mounted in a center bore formed in the cylinder block. The cylindrical support portion supports one of the bevel gears supporting the wobble plate. In such a supporting mechanism, a pair of grooves is axially formed on the outer surface of the cylindrical portion and on the inner surface of the central bore. These grooves oppose each other and form a chamber in a square pillar configuration. A metal key is fittingly inserted in the chamber. When the compressor operates and the wobble plate nutates, the key-groove mechanism prevents the rotational motion of the cylindrical portion.

In the above construction, during operation of the compressor, the cylindrical support portion continuously undergoes torque which tends to rotate the cylindrical support portion in the rotational direction of the drive shaft due to the gas pressure reaction force received by the wobble plate through the pistons and piston rods. The magnitude of this torque periodically fluctuates because the pistons reciprocate out of phase in their respective cylinders. The periodical torque fluctuation on the cylindrical support portion causes an undesirable vibration of the compressor housing. This undesirable vibration is propagated to an automobile passenger compartment as an offensive noise.

SUMMARY OF THE INVENTION

Accordingly, it is an object of this invention to provide a wobble plate type refrigerant compressor having a vibroisolating mechanism which can effectively reduce the vibration of a compressor housing caused by the gas reaction force acting on a wobble plate.

According to this invention, a wobble plate type compressor includes a compressor housing having a crank chamber and a cylinder block having a cylindrical central bore axially formed therethrough and a plurality of cylinders axially equiangularly formed around the central bore. A front end plate is attached to one end of the compressor housing. A cylinder head is attached to the other end of the compressor housing. A plurality of pistons are slidably fitted within each of the cylinders. A wedge-shaped cam rotor is disposed within the crank chamber to rotate together with a drive shaft. A wobble plate is coupled to the pistons through corresponding connecting rods and disposed on an inclined surface of the cam rotor to convert rotating motion of the cam rotor into reciprocating motion of the pistons.

A rotation preventing mechanism prevents rotation of the wobble plate during rotation of the drive shaft and the rotor. The rotation preventing mechanism includes a first bevel gear connected to the wobble plate and having a first ball seat portion, a second bevel gear having a second ball seat portion, and a ball element slidably disposed within the first and second ball seat portions. The second bevel gear includes a cylindrical shank portion fittingly disposed within the cylindrical central bore. At least one engaging mechanism (e.g., a key/groove mechanism) engages the cylindrical shank portion with the cylinder block to prevent rotation therebetween. The first and second bevel gears intermesh with one another whereby the rotation of the first bevel gear and the wobble plate is prevented by the at least one engaging mechanism. The engaging mechanism includes an axial hollow space or groove formed between the shank portion of the second bevel gear and the cylinder block, and a rod or key fittingly disposed within the axial hollow space. The engaging mechanism further includes a dampening mechanism or vibroisolating member for dampening torque which acts on the shank portion of the second bevel gear to thereby reduce vibration and noise.

DETAILED DESCRIPTION OF THE PREFERRED EMBODIMENT

Figure 1:
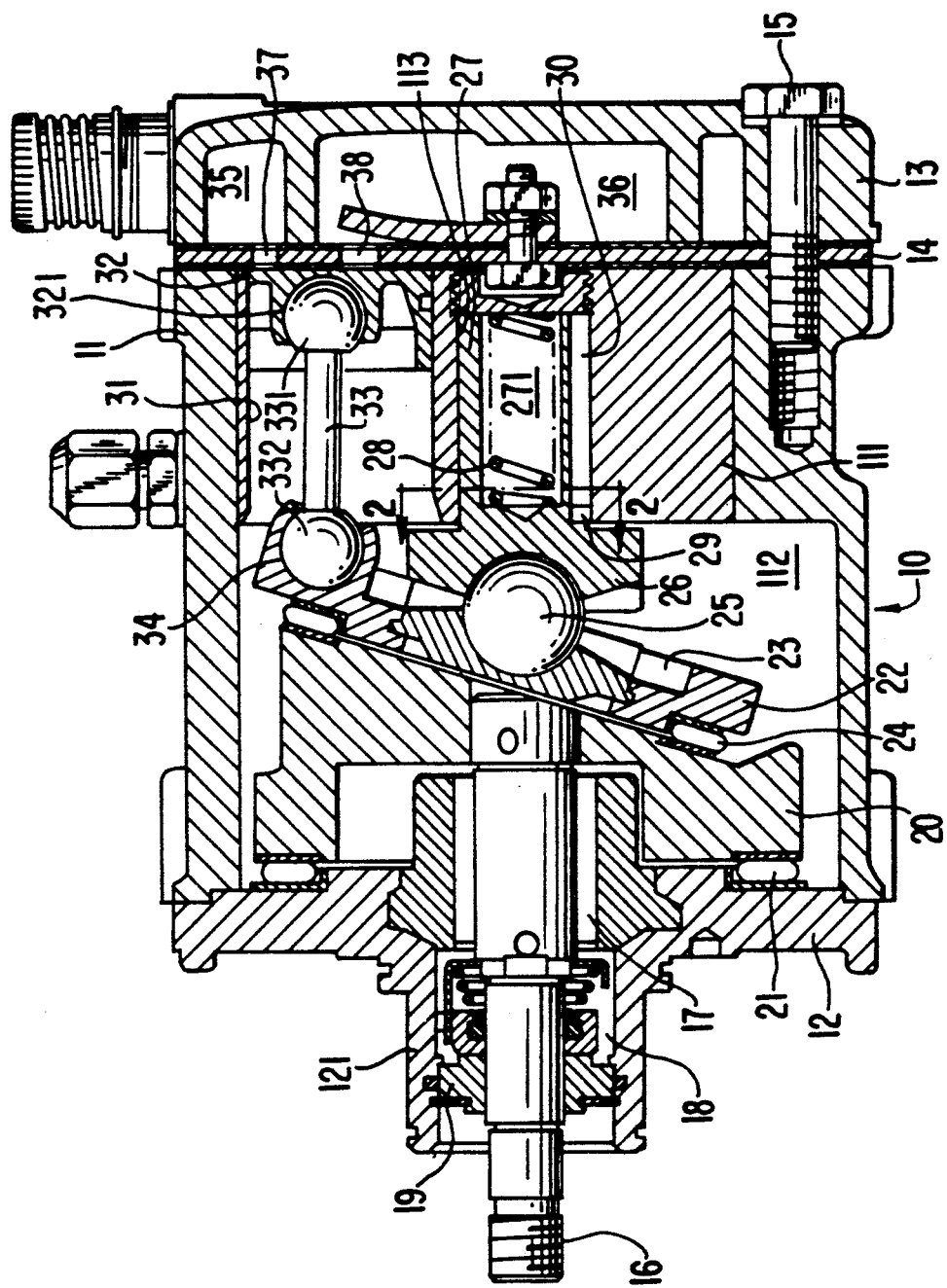
FIG. 1 illustrates a longitudinal cross-sectional view of a wobble plate type compressor according to a first embodiment of this invention.
Figure 2:
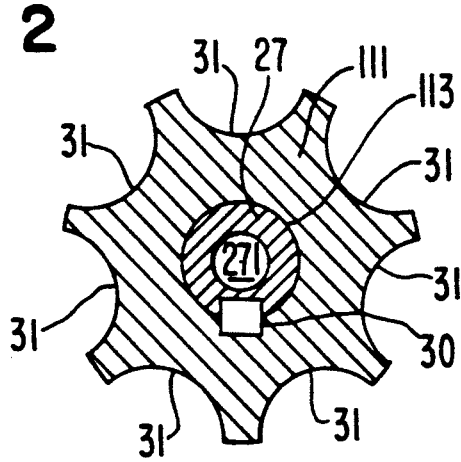
FIG. 2 illustrates a cross-sectional view taken along line 2—2 of FIG. 1.

FIG. 1 illustrates an overall construction of a wobble plate type refrigerant compressor according to a first embodiment of this invention. Referring to FIG. 1, the compressor, generally designated 10, comprises cylindrical housing 11 having cylinder block 111 in one end portion thereof, a hollow portion, such as crank chamber 112 at the other end portion, front end plate 12 and cylinder head 13.

Front end plate 12 is mounted on the left end portion of crank chamber 112 by a plurality of screws (not shown), and cylinder head 13 together with valve plate assembly 14 are mounted on the other one end portion of cylinder block 111 by a plurality of screws 15 (one of which is shown in FIG. 1) to complete a closed housing assembly for the compressor. An opening is formed in front end plate 12 and drive shaft 16 is rotatably supported by a bearing means, such as radial needle bearing 17, which is disposed in the opening. Front end plate 12 has annular sleeve portion 121 projecting from the front surface thereof and surrounding drive shaft 16 to define shaft seal cavity 18. Shaft seal assembly 19 is mounted about drive shaft 16 within shaft seal cavity 18.

At its inner end, drive shaft 16 is attached by any suitable means to a swash plate or cam rotor 20, such that cam rotor 20 is rotated along with drive shaft 16, and thrust needle bearing 21 is disposed between the inner surface of front end plate 12 and the adjacent axial end surface of cam rotor 20. The outer end of drive shaft 16, which extends outwardly from the housing, is adapted to be driven by the engine of a vehicle through a conventional clutch and pulley connection.

The sloping surface of cam rotor 20 is placed in close proximity to the surface of wobble plate 22, which is mounted on an oscillating bevel gear 23. Thrust needle bearing 24 is disposed between cam rotor 20 and wobble plate 22. Bevel gear 23 oscillates about a ball element 25 seated within a fixed bevel gear 26. The engagement of bevel gears 23 and 26 prevents rotation of wobble plate 22 during operation of compressor 10. Bevel gear 26 is supported on cylinder block 111 by cylindrical rod 27, which is inserted in central bore 113 formed in cylinder block 111. Rod 27 is provided with hole 271 at its rear end in which spring 28 is inserted. The end of spring 28 is in contact with a back wall of, or a stopper in, center bore 113. Spring 28 urges rod 27 toward wobble plate 22 to maintain the engagement of bevel gears 23 and 26. Chamber 29 is formed between the inner surface of central bore 113 and the outer surface of rod 27. Key 30 is fittingly disposed within chamber 29 to prevent the rotation of rod 27.

Cylinder block 111 is formed with a plurality of annularly arranged cylinders 31, in which pistons 32 are slidably fitted. A typical arrangement would include seven cylinders, but a smaller or larger number of cylinders may be provided. All pistons 32 are connected to wobble plate 22 by corresponding connecting rods 33. Ball 331 at one end of rod 33 is received in socket 321 formed in piston 32, and ball 332 at the other end of rod 33 is received in socket 34 formed in wobble plate 22. It should be understood that although only one such ball socket connection is shown in FIG. 1, in the embodiment shown there are a plurality of sockets arranged peripherally around wobble plate 22 to respectively receive the balls of the various rods, and that each of pistons 32 is formed with a socket for receiving the other ball of the rod.

Cylinder head 13 of the compressor is shaped to define suction chamber 35 and discharge chamber 36. Valve plate assembly 14, which is secured to the end portion of cylinder block 111 by screws 15 together with cylinder head 13, is provided with a plurality of valved suction ports 37 connecting suction chamber 35 and respective cylinders 31, and a plurality of valved discharge ports 38 connecting discharge chamber 36 and respective cylinders 31.

In operation, drive shaft 16 is rotated by the engine of the vehicle, and cam rotor 20 is rotated together with drive shaft 16 to cause non-rotatable, wobbling motion or nutation of wobble plate 22 about ball element 25. As the wobble plate nutates, key 30 prevents rotational motion of rod 27. Upon nutation of wobble plate 22, pistons 32 reciprocate out of phase in their respective cylinders 31, and refrigerant gas is taken into cylinders 31 to be compressed, and then is discharged from cylinders 31 to discharge chamber 36.

Figure 3:
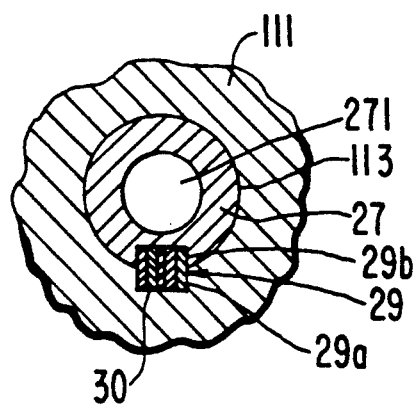
FIG. 3 illustrates an enlarged view of an essential portion of the first embodiment shown in FIG. 2.

Referring to FIG. 3, rod 27 is slidably fitted in central bore 113 formed in cylinder block 111. Grooves 29a and 29b are respectively formed on the inner surface of central bore 113 and on the outer surface of rod 27. Grooves 29a and 29b oppose each other to form a square pillar configuration or chamber 29. Key 30 is fittingly disposed within chamber 29 to prevent rotational motion of rod 27.

Figure 4:
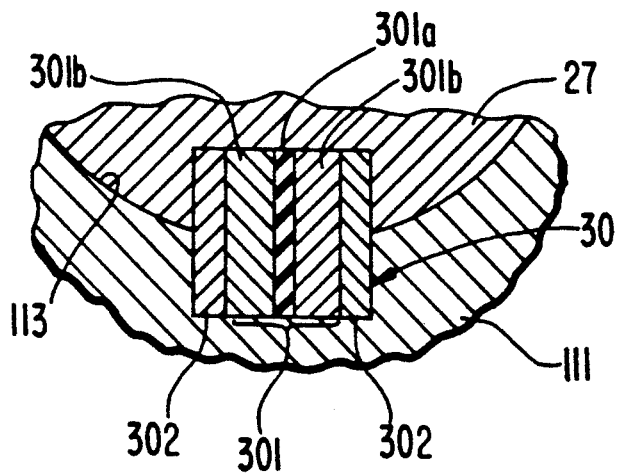
FIG. 4 illustrates a further enlarged view of the essential portion of the first embodiment shown in FIG. 2.

Referring to FIG. 4, key 30 comprises vibroisolating member 301 and a pair of metal plates 302 which fixedly sandwich vibroisolating member 301 therebetween by adhesion. Metal plates 302 are made of steel, which is processed by quenching. Vibroisolating member 301 comprises an elastic plate, such as rubber plate 301a and a pair of steel plates 301b fixedly sandwiching rubber plate 301a by adhesion. Furthermore, a plurality of vibroisolating members 301 may be layered between a pair of metal plates 302.

According to the above mentioned construction, the torque continuously acting on cylindrical rod 27, which tends to rotate cylindrical rod 27 in the rotational direction of drive shaft 16 due to the gas pressure reaction force received by wobble plate 22 through pistons 32 and piston rods 33, is effectively dampened by vibroisolating member 301 of key 30. As a result, the periodical torque fluctuation on key 30 is effectively leveled and the magnitude of the torque is reduced. Therefore, the vibration of housing 11 caused by the periodical torque fluctuation on key 30 is sufficiently reduced, thereby effectively eliminating an offensive noise which is caused by the vibration of housing 11.

Figure 5:
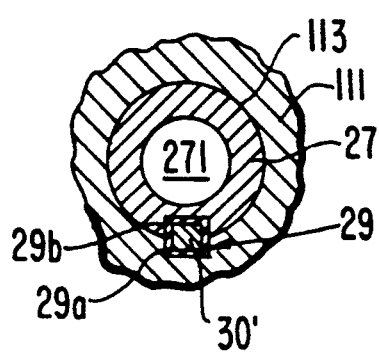
FIG. 5 illustrates a view of an essential portion of a wobble plate type refrigerant compressor according to a second embodiment of this invention in a manner similar to FIG. 3.
Figure 6:
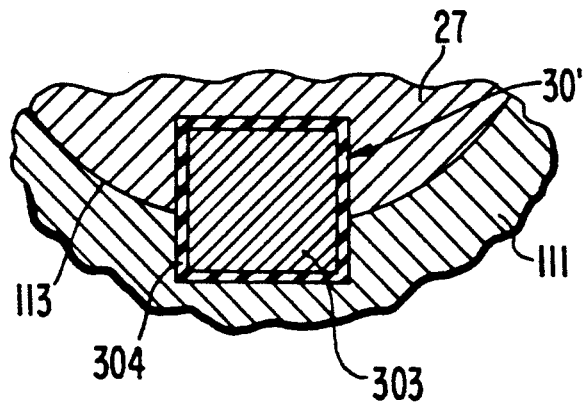
FIG. 6 illustrates a view of the essential portion of the second embodiment in a manner similar to FIG. 4.

FIGS. 5 and 6 illustrate an essential portion of a wobble plate type refrigerant compressor according to a second embodiment of this invention. In FIGS. 5 and 6, key 30' comprises bar 303 of steel formed in the square piller configuration and a vibroisolating member, such as rubber coating 304, covers the exterior surface of bar 303. The effect of the second embodiment is similar to the effect of the first embodiment so that an explanation thereof is omitted.

Figure 7:
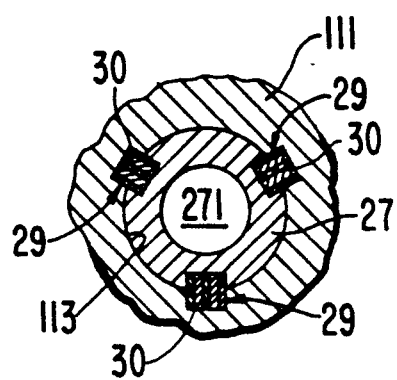
FIG. 7 illustrates a view of an essential portion of a wobble plate type refrigerant compressor according to a third embodiment of this invention in a manner similar to FIG. 3.

FIG. 7 illustrates an essential portion of a wobble plate type refrigerant compressor according to a third embodiment of this invention. In this embodiment, a plurality of keys 30 (preferably three) like those shown in the first embodiment are equiangularly spaced around cylindrical rod 27 in chambers 29.

Figure 8:
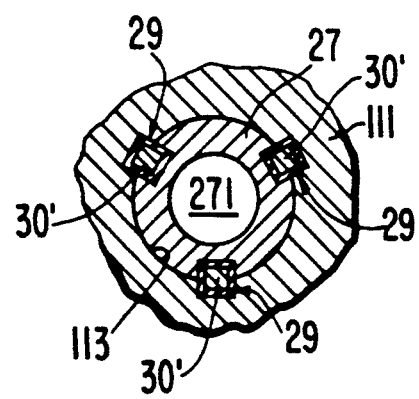
FIG. 8 illustrates a view of an essential portion of a wobble plate type refrigerant compressor according to a fourth embodiment of this invention in a manner similar to FIG. 3.

FIG. 8 illustrates an essential portion of a wobble plate type refrigerant compressor according to a fourth embodiment of this invention. In the embodiment, a plurality of keys 30' (preferably three) like those shown in the second embodiment are equiangularly spaced around cylindrical rod 27 in chambers 29.

According to the third and fourth embodiments of this invention, the periodical torque fluctuation on key 30 is more effectively leveled and the magnitude of the torque is further reduced in comparison with the first and second embodiments of this invention.

Although the invention has been described in detail in connection with the preferred embodiments, it will be understood by those skilled in the art that these embodiments are merely for illustration, and that various further modifications may be made therein without departing from the scope of this invention as defined by the appended claims.

We claim:

1. A wobble plate type compressor including a compressor housing having a crank chamber and a cylinder block having a cylindrical central bore axially formed therethrough and a plurality of cylinders formed around the central bore, a front end plate attached to one end of said compressor housing, a cylinder head attached to the other end of said compressor housing, a plurality of pistons slidably fitted within each of said cylinders, a cam rotor disposed within said crank chamber to rotate together with a drive shaft, a wobble plate coupled to said pistons through corresponding connecting rods and disposed on an inclined surface of said cam rotor to convert rotating motion of said cam rotor into reciprocating motion of said pistons, rotation preventing means for preventing rotation of said wobble plate during rotation of said drive shaft and said rotor, said rotation preventing means including a first bevel gear connected to said wobble plate and having a first ball seat portion, a second bevel gear having a second ball seat portion, and a spherical element slidably disposed within said first and second ball seat portions, said second bevel gear including a cylindrical shank portion disposed within said cylindrical central bore, at least one engaging means for engaging said cylindrical shank portion of said second bevel gear with said cylinder block to prevent rotation therebetween, said first and second bevel gears intermeshing with one another whereby the rotation of said first bevel gear and said wobble plate is prevented by said engaging means, said engaging means including an axial hollow space formed between said shank portion of said second bevel gear and said cylinder block and a rod member disposed within said axial hollow space, said engaging means further including dampening means for dampening torque which acts on said shank portion of said second bevel gear to thereby reduce vibration and noise within said wobble plate type compressor.

2. The wobble plate type compressor of claim 1 wherein said dampening means includes an elastic member radially extending through an interior of said rod member.

3. The wobble plate type compressor of claim 2 wherein said elastic member is rubber.

4. The wobble plate type compressor of claim 1 wherein said dampening means includes an elastic member covering an exterior surface of said rod member.

5. The wobble plate type compressor of claim 4 wherein said elastic member is rubber.

6. The wobble plate type compressor of claim 1 wherein a radial cross sectional view of said axial hollow space is rectangular-shaped.

7. The wobble plate type compressor of claim 6 wherein said dampening means includes an elastic rubber member radially extending through an interior of said rod member.

8. The wobble plate type compressor of claim 6 wherein said dampening means includes an elastic rubber member covering an exterior surface of said rod member.

9. The wobble plate type compressor of claim 1 wherein said at least one engaging means comprises three equiangularly spaced engaging means.

* * * * *